United States Patent
Chua et al.

(10) Patent No.: US 11,188,756 B2
(45) Date of Patent: Nov. 30, 2021

(54) OBJECT LOCALIZATION AND CLASSIFICATION SYSTEM AND METHOD THEREOF

(71) Applicant: Realtek Singapore Private Limited, Singapore (SG)

(72) Inventors: Tien Ping Chua, Singapore (SG); Zhengyu Li, Singapore (SG); Ruchi Mangesh Dhamnaskar, Singapore (SG); Chen-Feng Kuo, Hsinchu (TW)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 175 days.

(21) Appl. No.: 16/655,212

(22) Filed: Oct. 16, 2019

(65) Prior Publication Data

US 2021/0117683 A1    Apr. 22, 2021

(51) Int. Cl.
| | |
|---|---|
| G06K 9/00 | (2006.01) |
| G06T 7/246 | (2017.01) |
| G06T 7/254 | (2017.01) |
| H04N 19/132 | (2014.01) |
| H04N 19/587 | (2014.01) |

(52) U.S. Cl.
CPC ...... *G06K 9/00711* (2013.01); *G06K 9/00671* (2013.01); *G06T 7/246* (2017.01); *G06T 7/254* (2017.01); *H04N 19/132* (2014.11); *H04N 19/587* (2014.11); *G06T 2207/10021* (2013.01)

(58) Field of Classification Search
CPC ...... G06K 9/38; G06K 9/6407; G06K 9/6423; G06K 9/6476; G06K 9/00084; G06K 9/00671; G06K 9/00718; G06K 9/00797; G06K 9/6217; G06K 9/00711; G06T 7/0081; G06T 7/0083; G06T 7/246; G06T 7/254; G06T 2207/20144; G06T 2207/10016; G06T 2207/10021; G06F 17/30257; G06F 17/3024; G06F 17/3072; H04N 19/132; H04N 19/587; H04N 1/40062

See application file for complete search history.

(56) References Cited

U.S. PATENT DOCUMENTS

| | | | |
|---|---|---|---|
| 6,748,114 B1 * | 6/2004 | Ishikawa | H04N 19/114 348/700 |
| 7,079,579 B2 * | 7/2006 | Han | H04N 19/51 348/721 |

(Continued)

FOREIGN PATENT DOCUMENTS

| | | |
|---|---|---|
| CN | 109063659 A | 12/2018 |
| TW | 201530496 A | 8/2015 |

*Primary Examiner* — Amir Alavi
(74) *Attorney, Agent, or Firm* — McClure, Qualey & Rodack, LLP

(57) ABSTRACT

An object localization system including an object detection module configured to detect an object in a current frame with reference to a preceded frame, and an object localization module configured to identify a location of the object according to the segment. The object detection module includes a difference module for computing differences between the preceded frame and the current frame at a same location to generate a difference frame, a selected block detection module for identifying a selected block of the difference frame according to a predetermined minimum difference, a segment generation module for generating a segment of the current frame.

17 Claims, 9 Drawing Sheets

(56) References Cited

U.S. PATENT DOCUMENTS

| | | | | |
|---|---|---|---|---|
| 7,606,303 B2* | 10/2009 | Nemiroff | ............. | H04N 19/172 |
| | | | | 375/240.01 |
| 7,668,392 B2* | 2/2010 | Yamada | ................. | H04N 19/14 |
| | | | | 382/268 |
| 7,961,787 B2* | 6/2011 | Tsai | ....................... | H04N 19/61 |
| | | | | 375/240.12 |
| 8,064,522 B2* | 11/2011 | Kondo | ................... | H04N 19/43 |
| | | | | 375/240.16 |
| 8,077,775 B2* | 12/2011 | He | ....................... | H04N 19/124 |
| | | | | 375/240.03 |
| 8,144,782 B2* | 3/2012 | Lee | ....................... | H04N 19/14 |
| | | | | 375/240.16 |
| 8,254,671 B1* | 8/2012 | Roth | .................... | G06F 16/783 |
| | | | | 382/165 |
| 8,401,318 B2* | 3/2013 | Tetsukawa | ............. | H04N 19/56 |
| | | | | 382/236 |
| 8,462,211 B2* | 6/2013 | Lopota | ................... | G06T 7/215 |
| | | | | 348/149 |
| 2019/0104314 A1* | 4/2019 | Yonezawa | ............ | H04N 19/124 |
| 2021/0117683 A1* | 4/2021 | Chua | ....................... | G06T 7/254 |

* cited by examiner

| Index | 0 | 1 | 2 | 3 | ...... | ...... | ...... |
|---|---|---|---|---|---|---|---|
| Segment label | 0 | 3 | 3 | 3 | ...... | 0 | 0 |
| Segment label block count | 524 | 0 | 0 | 52 | ...... | 0 | 0 |

OBJECT LOCALIZATION AND CLASSIFICATION SYSTEM AND METHOD THEREOF

BACKGROUND OF THE INVENTION

1. Field of the Invention

The present invention is related to image recognition, and more particularly to object localization and/or classification.

2. Description of the Prior Art

Image recognition technologies for detecting objects such as humans and non-humans have been widely used in various devices such as monitoring cameras, vehicle safety devices, and digital still cameras. Such technologies are expected to be widely applied to, e.g., identification of a suspicious person, collection of marketing information, or risk prediction, by tracking an object and determining the type of the objects behavior.

Conventional approaches to image recognition techniques such as moving object localization and classification includes various types of deep convolutional neural networks that are computationally intensive and are often processed by high performance computers in remote datacenters. It is, however, not yet optimized for IOT (Internet of Things) edge devices with much less computational capability.

The conventional approach for processing moving regions in a video frame is computationally expensive. In order to reduce the effect of noise caused by variation in lighting and capturing devices, a filter can be applied to the difference image of the reference frame and the current frame. The morphological filtering such as dilation and erosion is applied to the difference image (the image processed by pixel differencing techniques) to remove small isolated sections of image difference and to produce the filtered image. The current method of image segmentation applied to the filtered image to partition them to different segments corresponding to different moving objects is computational intensive. Hence, there is a need for a less computational intensive system and method for image segmentation, localization and classification.

SUMMARY OF THE INVENTION

The embodiment provides an object localization system comprising an object detection module configured to detect an object in a current frame with reference to a preceded frame, and an object localization module configured to identify a location of the object according to the segment. The object detection module comprises a difference module configured to compute differences between the preceded frame and the current frame at a same location to generate a difference frame, a selected block detection module configured to identify a selected block of the difference frame according to a predetermined minimum difference, a segment generation module, configured to generate a segment of the current frame. The segment is part of the object and is defined by selected blocks of the difference frame connected to each other by neighboring selected blocks, and configured to assign each selected block of the segment with a segment label in a raster scan, wherein the segment label identifies the segment and is different for each disjoint segment.

The embodiment provides a method of localizing an object in a current frame of a sequence of frames with reference to a preceded frame. The method comprises detecting an object. Detecting the object comprises generating a difference frame equal to an absolute difference between the current frame and the preceded frame, computing differences between the preceded frame and the current frame at a same location to generate a difference frame, identifying a block in the difference frame that has a number of the differences within the block greater than a minimum difference value as a selected block, and generating a segment of the current frame. The segment is part of the object and is defined by selected blocks connected to each other by neighboring selected blocks, by assigning each selected block of the segment with a segment label in a raster scan, wherein the segment label identifies the segment and is different for each disjoint segment.

The embodiment provides a method of generating a selected segment of an image through a raster scan. The method comprises identifying a pixel having a luma value according to a first predetermined threshold value as a selected pixel, generating a selected segment of the image, the selected segment defined by selected pixels of the image connected to each other by neighboring selected pixels, and assigning each selected pixel of the selected segment with a segment label in a raster scan, wherein the segment label identifies the selected segment and is different for each disjoint selected segment.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates an indexed frame generated through raster scan and index assignment by the segment generation module of FIG. 2.

FIG. 5 illustrates a labeled frame 410 with a segment label assigned to each block by the moving segment generation module of FIG. 2.

FIG. 6 is a diagram showing the segment label array and the segment label block count array.

FIG. 8 illustrates an indexed image generated through raster scan and index assignment to each pixel through the segment generation method.

DETAILED DESCRIPTION

Figure 1:
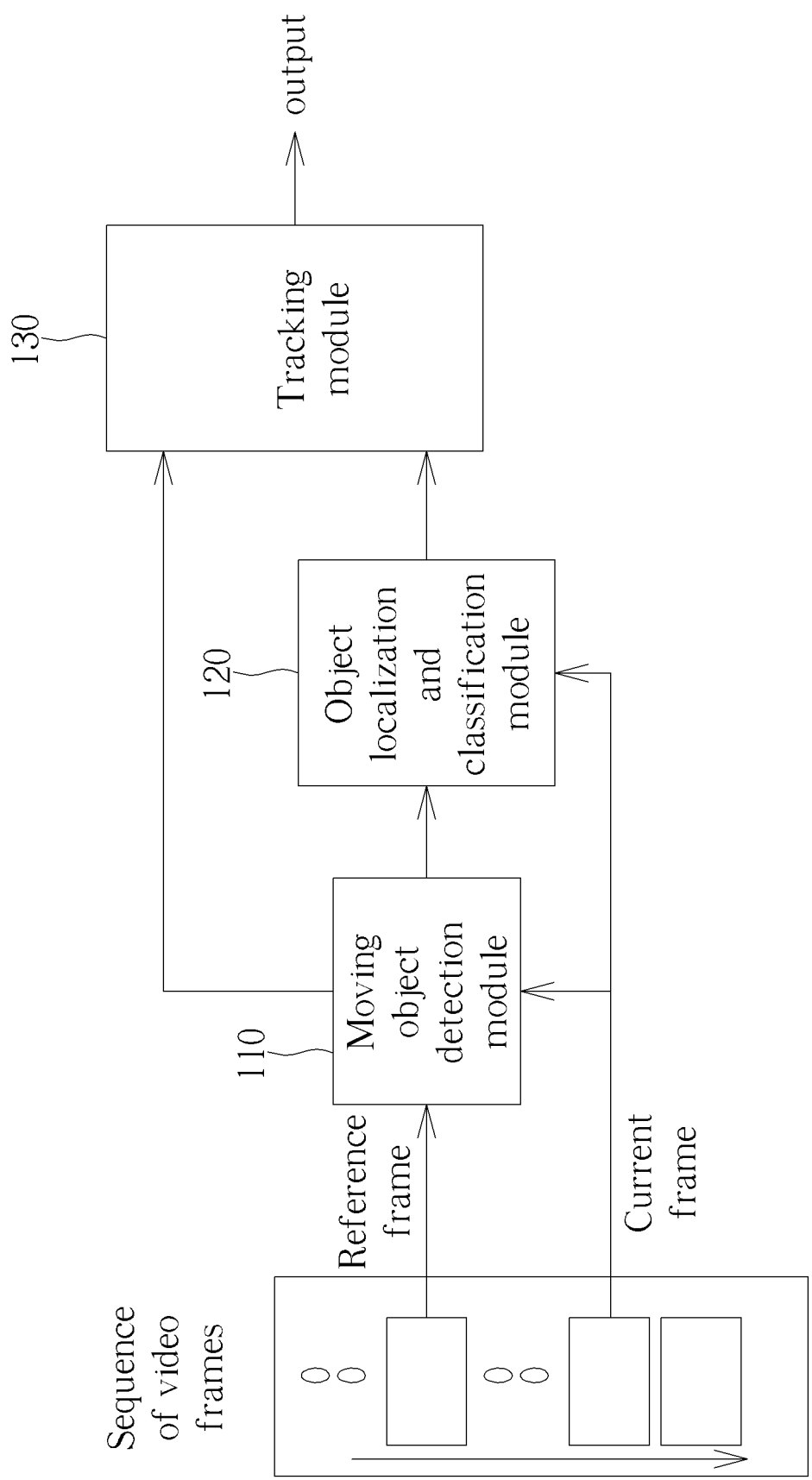
FIG. 1 is schematic diagram a moving object localization and classification system of an embodiment of the present invention.

FIG. 1 is schematic diagram a moving object localization and classification system 100 of an embodiment of the present invention. The modules in the system 100 can be implemented by either hardware or software. The system comprises a moving object detection module 110, an object localization/classification module 120 and a tracking module 130. The moving object detection module 110 detects a moving object in a current frame of a video sequence with reference to a reference frame (e.g., previous frame). The object localization/classification module 120 identifies a type and/or a location of the moving object. The tracking module 130 is for tracking the location of the moving object.

As illustrated in the FIG. 1, the system 100 receives a plurality of frames as the input. The plurality of frames includes the current frame and the reference frame preceding the current frame. Additional parameters such as minimum and maximum size of the objects and moving rate of the objects, can also be inputted into the system. The number of frames between the reference frame and current frame can be determined by the moving rate of the objects and the frame rate of the capturing device. The current frame can be processed by the object localization/classification module 120 to extract information on object location and object type.

Figure 2:
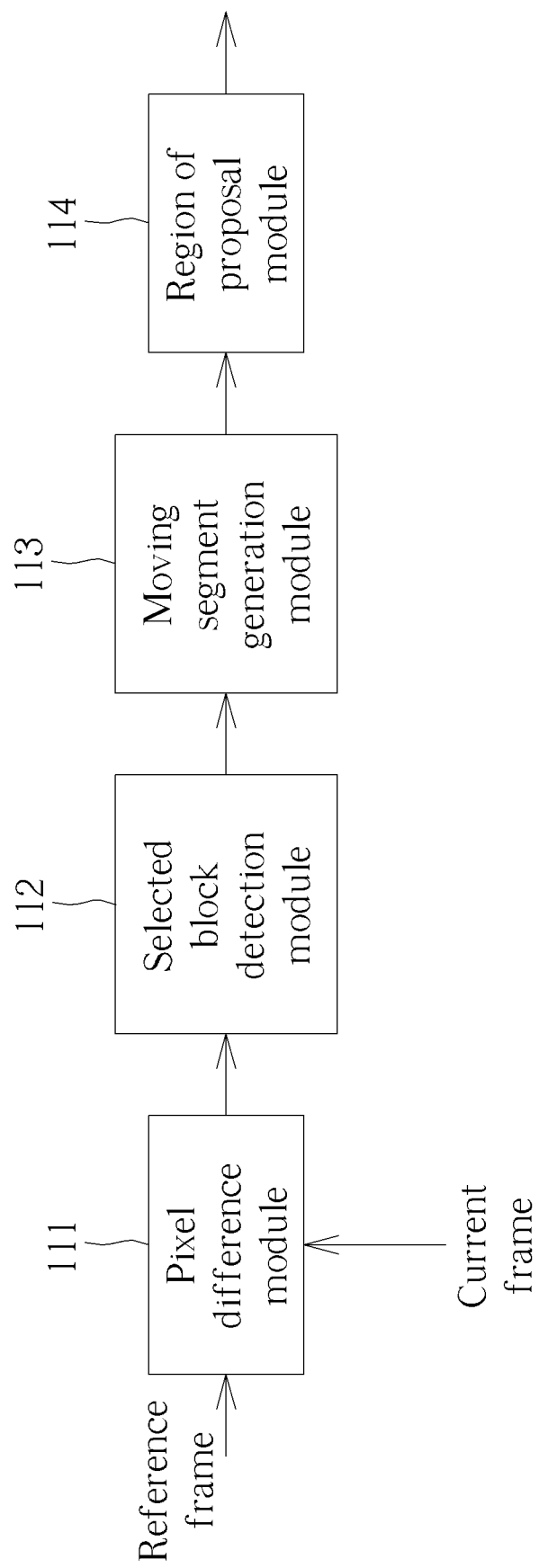
FIG. 2 is a schematic diagram of the moving object detection module of FIG. 1 of an embodiment.
Figure 3:
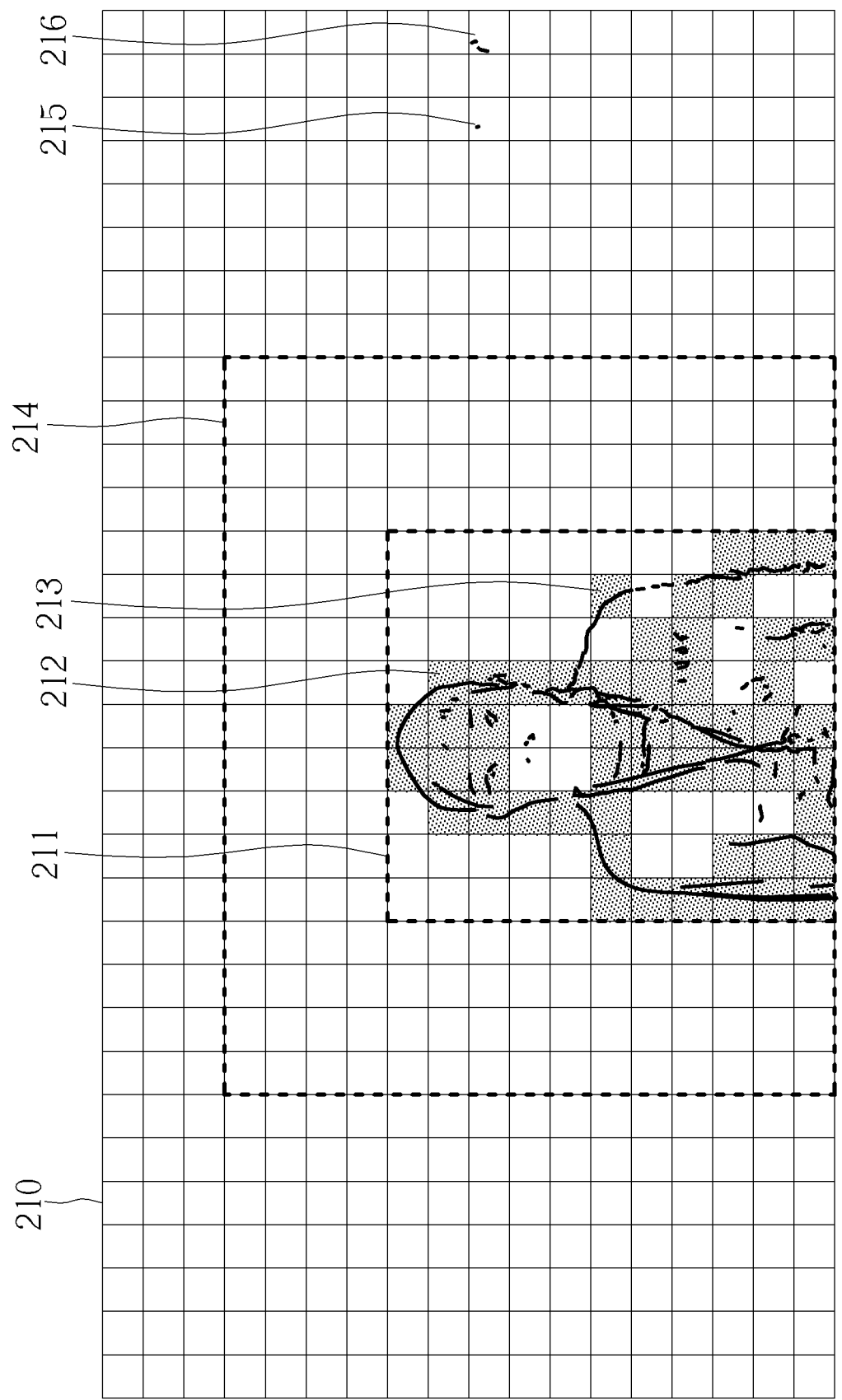
FIG. 3 illustrates a pixel difference frame of an embodiment.

FIG. 2 is a schematic diagram of the moving object detection module 110 of an embodiment. FIG. 3 illustrates a pixel difference frame 210 of an embodiment. The moving object detection module 110 comprises a pixel difference module 111, a selected block detection module 112, a segment generation module 113, and a region of proposal module 114. The pixel difference module 111 is for computing the difference in pixel values between the reference frame and the current frame at the same pixel (or block) location to generate the pixel difference frame 210. A preferred mode of operation to achieve low computation is to use only the pixel luminance information for computing the pixel differences, although other methods of computing pixel differences fall within the scope of the invention. The selected block detection module 112 is for identifying the selected blocks 212 of the current frame, which have a predetermined minimum difference in pixel values between the detecting and the reference frame at the same location. The segment generation module 113 is for generating a segment 213 of the current frame. The segment 213 is defined by selected blocks 212 of the current frame connected to each other by neighboring selected blocks 212. The region of proposal module 114 is for computing the region of proposal 214 containing the moving segment.

The moving object detection module 110 can localize a moving region 211 that contains the moving object to be classified. The moving object detection module 110 can localize the moving region 211 by identifying the selected blocks 212 and draw a bounding box enclosing these selected blocks 212. As shown in the figure, the moving segment 213 is within the moving region 211. The selected blocks 212 are partitions of pixel difference frame. The block size and shape can be defined by the minimum and maximum size of objects in the current frame 210. For example, the blocks can be squares of size 8×8, 16×16 or 20×20. If the block size is 8×8, it contains 64 pixels. If the block size is 16×16, it contains 256 pixels. If the block size is 20×20, it contains 400 pixels. In addition, based on the location information from the moving object detection module 110, a region of proposal 214 that contains all the selected blocks of the moving region 211 or moving segment 213 of object, can be defined by the moving object detection module 110. A block 215 represents a block containing image noise caused by variation in lighting or image capturing device. A block 216 represents a block with pixel difference also below the minimum value. The blocks 215 and 216 would not be included in the moving region and therefore do not affect the image process described here.

Figure 4:
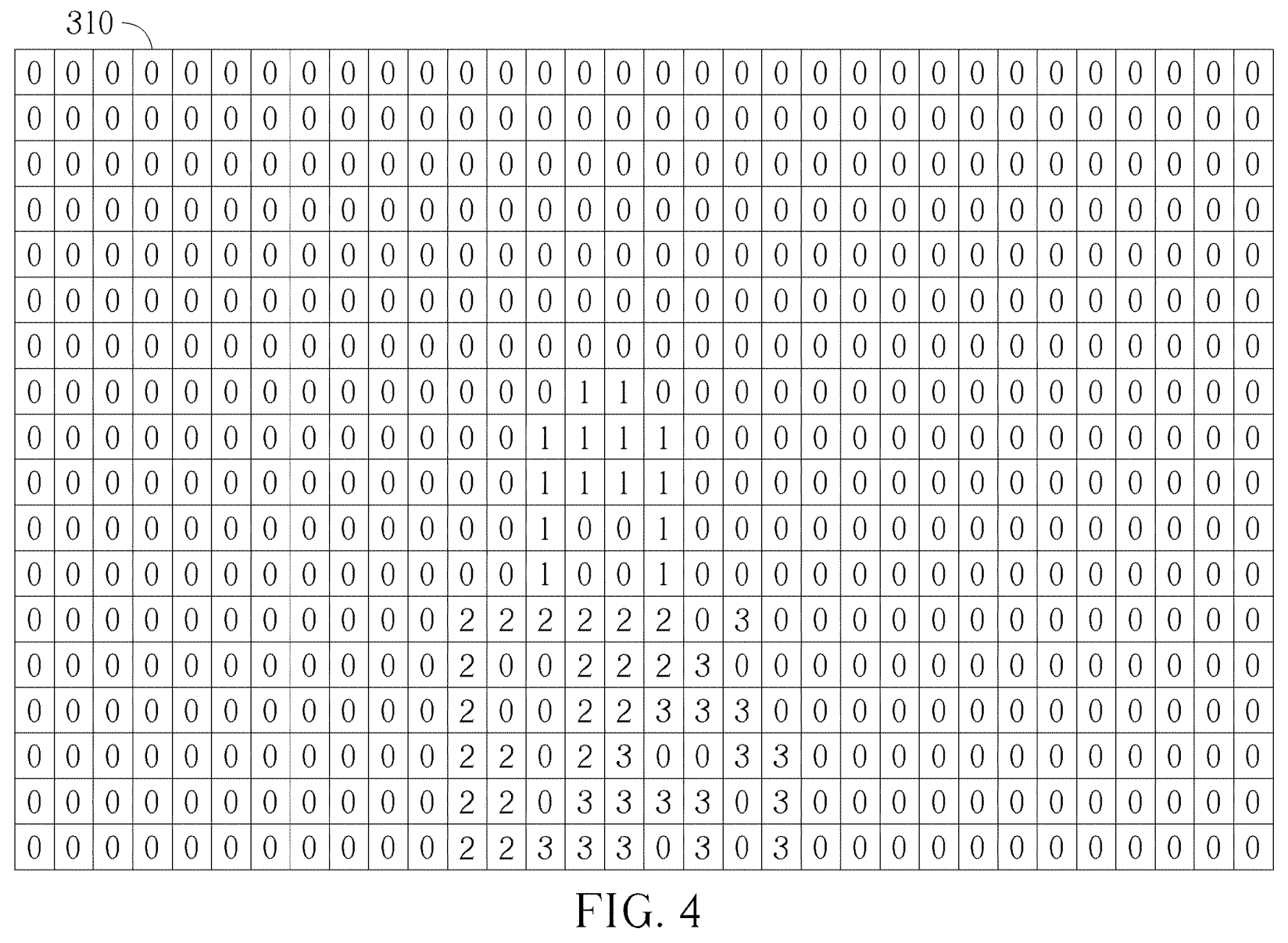

FIG. 4 illustrates an indexed frame 310 generated through raster scan and index assignment by the moving segment generation module 113. The pixel difference frame 210 can be inputted into the moving segment generation module 113. Each block of the frame is then examined in raster scan sequence to determine which blocks are selected. In the embodiment, selected blocks are defined as blocks that have a difference in pixel values between the detecting and the reference frame at a same location greater than or equal to a predetermined minimum. Neighboring blocks are defined as blocks on its left, top, top-left and top-right. In the frame 310, if the block being scanned is not a selected block, it is assigned the index of 0. Otherwise, if the block has all neighboring blocks not being selected blocks, it is assigned the index of an lowest unused value. Otherwise, for the block having at least one neighboring block as a selected block, the block is assigned the index of the highest value of neighboring selected blocks.

Figure 5:
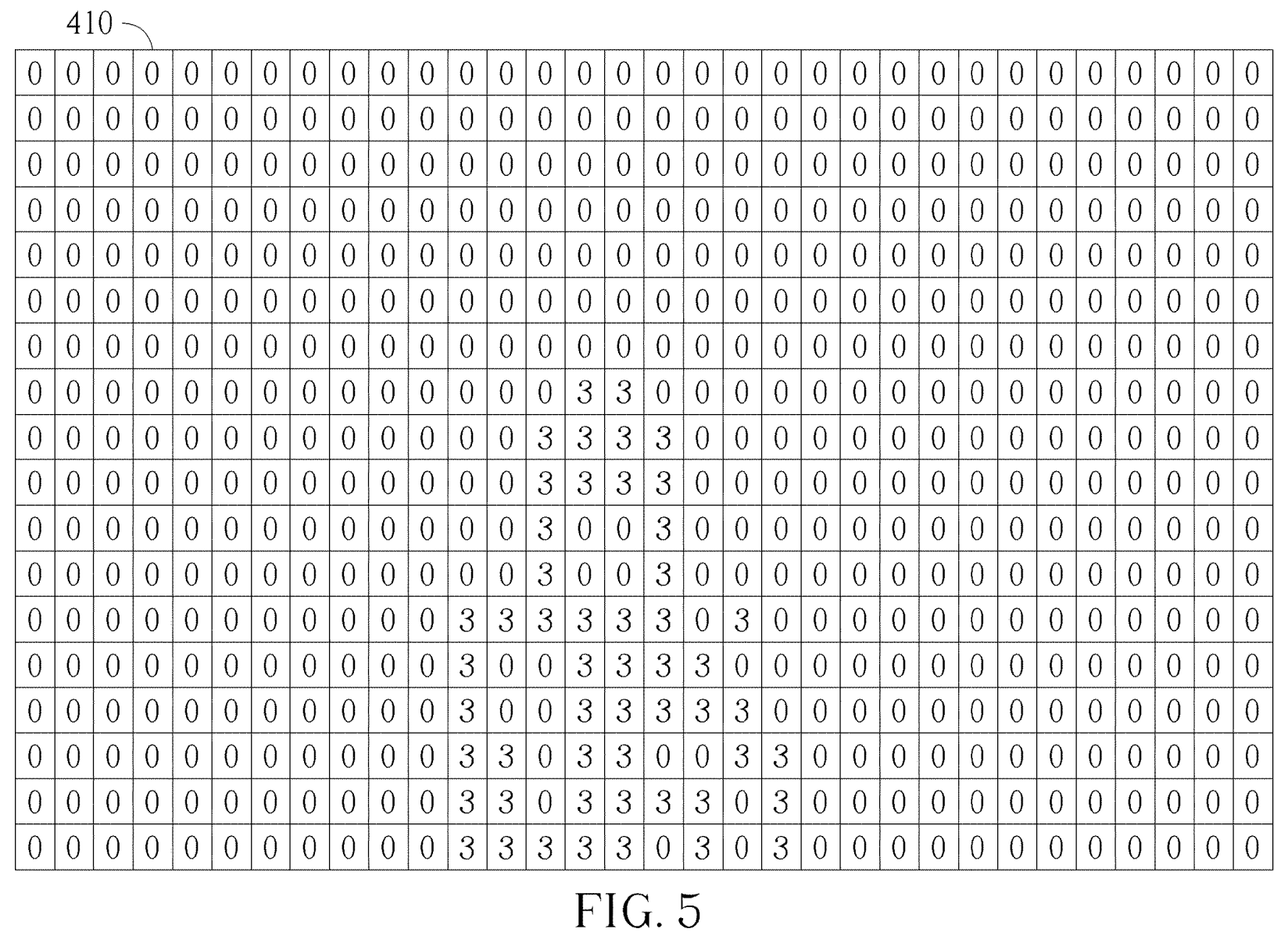

The following descriptions refer to FIGS. 5 and 6. FIG. 5 illustrates a labeled frame 410 with a segment label assigned to each block by the moving segment generation module 113. FIG. 6 is a diagram showing the segment label array and the segment label block count array. As shown in the figures, each segment index is a pointer to a corresponding segment label. Segment label is used as pointer to its corresponding segment label block count. During the raster scan, if the block being scanned is a selected block, the segment label of all its neighboring selected blocks would be changed to the same value as the index value of the selected block. For example, the segment label value of 3 is assigned to the selected blocks with index 1 in segment label array.

Furthermore, the segment label block count array is initialized to zero before the raster scan. During the raster scan, when the block being scanned is assigned a segment label, its corresponding segment label block count would increase by one. If the block being scanned is a selected block, its corresponding segment label block count would increase by the sum of the values of segment label block count of the neighboring selected blocks and then set the values of segment label block count of the neighboring selected blocks to zero. As shown in FIG. 6, in the embodiment the segment label for index 0 is 0, and includes 524 blocks. The segment label for index 1 and 2 is 3 and the segment label for index 3 is also 3. The segment label of 3 includes 52 blocks. The segment label block count can be used in the following image processing module. Indicating size of segment can be used for subsequent processing such as removing small segments caused by noise or segments smaller than the targeted object size.

The result is a binary mask for the pixel difference frame 210. For example, the mask values of 1 (corresponding to segment label value of 3) indicates selected blocks and the other blocks have the mask values of 0 (corresponding to segment label value of 0). Also, this method would allow the moving segment generation module 113 to assign different segment labels to disjoint moving segments if there are more than one moving segments in the pixel difference frame 210.

After the process, the moving object detection module 110 would output the binary mask a plurality of region of proposal for further image processing such as object localization and classification, and object tracking as illustrated in FIG. 1. The binary mask can be generated by one-pass raster scan. In an embodiment, the binary mask can be generated before the next frame is received. Processing only the proposed regions is less computationally intensive than processing the whole image. This can enable low power processing. This can also enable the use of more computationally intensive processing for better localization and classification results, such as deep convolutional neural network.

Figure 7:
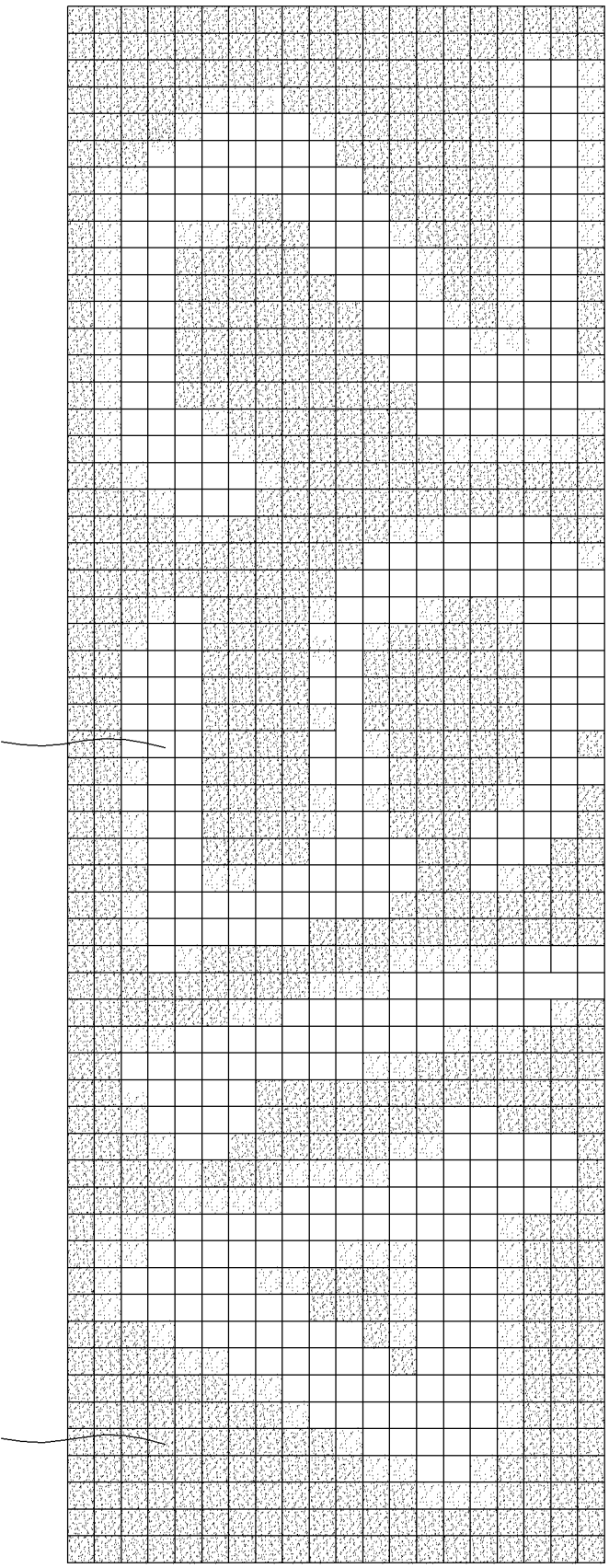
FIG. 7 is an example of applying the segment generation method of the present invention to an image with characters.

The same segment generation method may also be applied to a fixed single image. FIG. 7 is an example of applying the segment generation method of the present invention to an image with characters. After the segment generation process, the pixels of the image can be categorized to background pixels 710 and character (or selected) pixels 720 based on at least one of the brightness of the pixel, luma value, being above or below a said set threshold.

Figure 8:
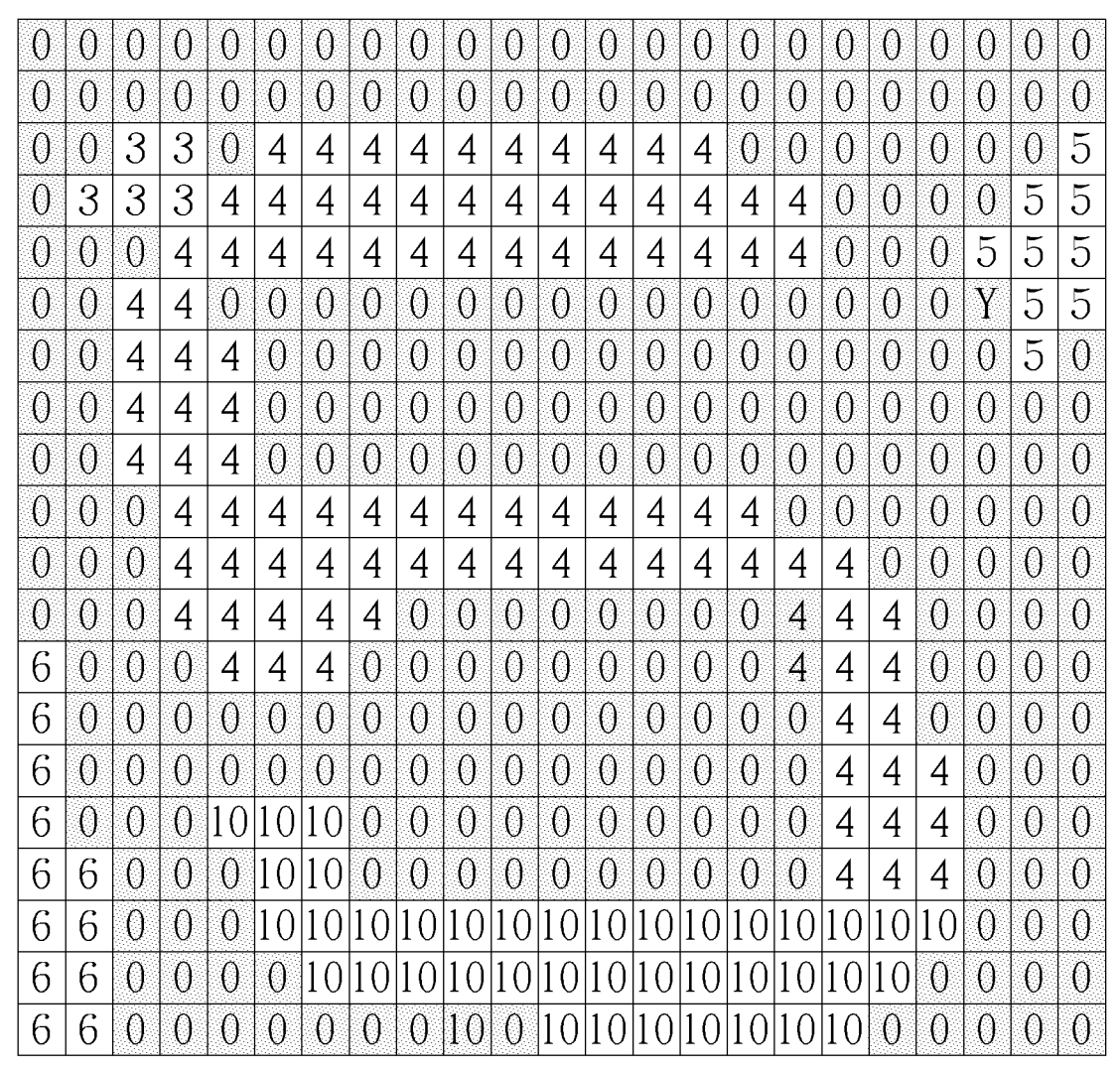

FIG. 8 illustrates an indexed image generated through raster scan and index assignment to each pixel through the segment generation method. Pixels with indices 3, 4 and 10 belong to the character "5". Each pixel of the image is then examined in raster scan sequence to determine which pixels are selected. In the embodiment, the selected pixels can be defined as pixels that have luma values below a first predetermined threshold value. In another embodiment, the selected pixels can be defined as pixels that have luma values above a second predetermined threshold value.

Neighboring pixels are defined as pixels on its left, top, top-left and top-right. For this image, if the pixel being scanned is an unselected pixel, it is assigned the index of 0. Otherwise, if the pixel has all neighboring pixel being unselected pixel, it is assigned the index of an lowest unused value. Otherwise, for the pixel having at least one neighboring pixel as a selected pixel, the pixel is assigned the index of the highest value of neighboring selected pixel.

Figure 9:
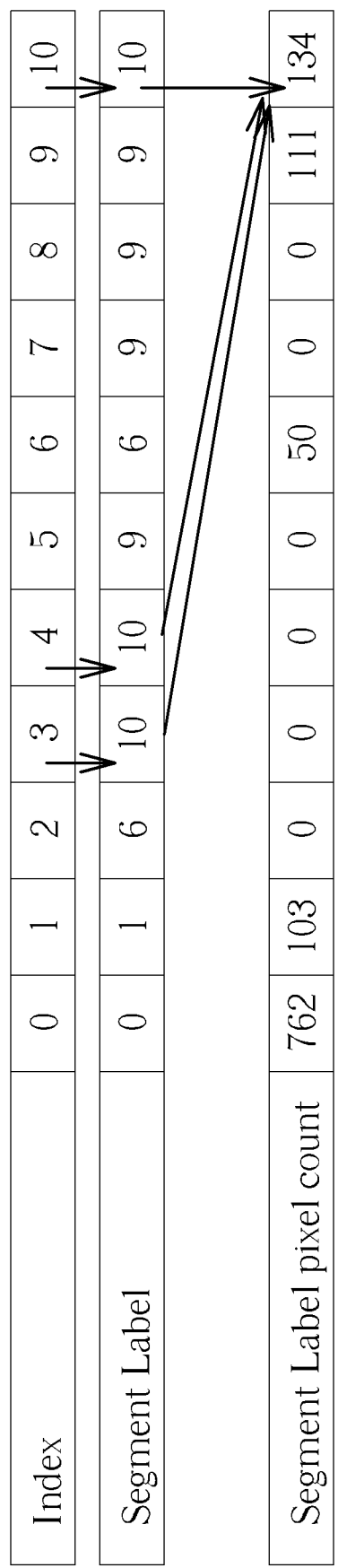
FIG. 9 is a diagram showing the segment label array and the segment label pixel count array.

FIG. 9 is a diagram showing the segment label array and the segment label pixel count array. The segment label pixel count array is initialized to zero before the raster scan. During the raster scan, when the pixel being scanned is assigned a segment label, its corresponding segment label pixel count would increase by one. If the pixel being scanned is a selected pixel, its corresponding segment label pixel count would increase by a sum of the values of segment label pixel count of the neighboring selected pixels and then set the values of the segment label pixel count of the neighboring selected pixels to zero. As shown in FIG. 9, the segment label for index 0, representing the background pixels, is 0. The segment label pixel count for index 0 is 762. The selected pixels are labeled with different segment labels. In the embodiment, the character "4" (FIG. 7), which includes 103 pixels, is labeled with segment label of 1. The character "1", which includes 50 pixels, is labeled with segment label of 6. The character "5", which includes 134 pixels, is labeled with segment label of 10. The character "2", which includes 111 pixels, is labeled with segment label of 9. The segment label pixel count can be used extract more information in the image processing. The size of segment can be used for subsequent processing such as removing small segments caused by noise or segments smaller than the targeted character size. Each segment is input to object classification and being classified as respective character "4", "1", "5" and "2".

In summary, the moving object localization and classification system with the method of image segment generation of the present invention can effectively reduce computational complexity of the image processing. Therefore, the system and the method can be implemented to computer devices with less computational capacity such as IOT edge devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object localization system comprising:
   an object detection circuit configured to detect an object in a current frame with reference to a preceded frame, the object detection circuit comprising:
   a difference circuit configured to compute differences between the preceded frame and the current frame at a same location to generate a difference frame;
   a selected block detection circuit configured to identify a selected block of the difference frame according to a predetermined minimum difference;
   a segment generation circuit configured to generate a segment of the current frame, the segment is part of the object and is defined by selected blocks of the difference frame connected to each other by neighboring selected blocks, and configured to assign each selected block of the segment with a segment label in a raster scan, wherein the segment label identifies the segment and is different for each disjoint segment; and
   an object localization circuit configured to identify a location of the object according to the segment.

2. The system of claim 1, wherein the segment generation circuit is further configured to assign an index to each block of the current frame, and to count a number of the selected blocks with a same segment label.

3. The system of claim 2, wherein the segment generation circuit is further configured to generate a binary mask for the difference frame.

4. The system of claim 1, the object detection circuit further comprising a region of proposal circuit, configured to compute a region of proposal encompassing the segment for obtaining information on the object.

5. The system of claim 1, the system further comprising:
   a tracking circuit, coupled to the object localization circuit, configured to track the location of the object.

6. The system of claim 1, wherein the segment is generated before the next frame is received by the object detection circuit.

7. A method of localizing an object in a current frame of a sequence of frames with reference to a preceded frame, the method comprising:
   detecting an object, comprising:
   generating a difference frame equal to an absolute difference between the current frame and the preceded frame;
   computing differences between the preceded frame and the current frame at a same location to generate a difference frame
   identifying a block in the difference frame that has a number of the differences within the block greater than a minimum difference value as a selected block; and
   generating a segment of the current frame, the segment is part of the object and is defined by selected blocks connected to each other by neighboring selected blocks, by assigning each selected block of the segment with a segment label in a raster scan, wherein the segment label identifies the segment and is different for each disjoint segment.

8. The method of claim 7, further comprising identifying a location of the object according to the segment.

9. The method of claim 8, further comprising tracking the location of the moving object.

10. The method of claim 7, detecting the object further comprising:
   assigning an index to each block of a difference frame; and
   counting a number of the selected blocks with a same segment label.

11. The method of claim 10, detecting the object further comprising:
   generating a binary mask for the difference frame; and
   generating a region of proposal comprising the segment for obtaining information on the object.

12. The method of claim 7, wherein the segment is generated before the next frame is received.

13. A method of generating a selected segment of an image through a raster scan, the method comprising:
   identifying a pixel having a luma value according to a first predetermined threshold value as a selected pixel;
   generating a selected segment of the image, the selected segment defined by selected pixels of the image connected to each other by neighboring selected pixels; and
   assigning each selected pixel of the selected segment with a segment label in a raster scan, wherein the segment label identifies the selected segment and is different for each disjoint selected segment.

14. The method of claim 13, further comprising assigning an index to each pixel of the image.

15. The method of claim 13, further comprising counting a number of the selected pixels with a same segment label.

16. The method of claim 13, further comprising generating a binary mask for the image.

17. The method of claim 13, further comprising identifying a pixel having the luma value of the pixel according to a second predetermined threshold value different from the first predetermined threshold value as a selected pixel.

* * * * *